US010285118B2

(12) United States Patent
Salim et al.

(10) Patent No.: US 10,285,118 B2
(45) Date of Patent: May 7, 2019

(54) COMMUNICATION TERMINAL AND METHOD FOR PERFORMING A CELL SEARCH

(71) Applicant: INTEL IP CORPORATION, Santa Clara, CA (US)

(72) Inventors: Umer Salim, Antibes (FR); Tudor Murgan, Munich (DE); Thorsten Clevorn, Munich (DE); Herbert Dawid, Herzogenrath (DE); Jean-Xavier Canonici, Cannes (FR); Frank Huertgen, Krefeld (DE); Peter Ascheuer, Dusseldorf (DE); Almansor Kerroum, Duesseldorf (DE); Sonja Stefan-Vetten, Krefeld (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/357,751

(22) Filed: Nov. 21, 2016

(65) Prior Publication Data

US 2017/0181068 A1 Jun. 22, 2017

(30) Foreign Application Priority Data

Dec. 22, 2015 (EP) .................................. 15201914

(51) Int. Cl.
*H04W 36/00* (2009.01)
*H04W 36/24* (2009.01)
(Continued)

(52) U.S. Cl.
CPC ........... *H04W 48/16* (2013.01); *H04W 36/30* (2013.01); *H04W 36/32* (2013.01);
(Continued)

(58) Field of Classification Search
CPC ................. H04W 48/20; H04W 48/18; H04W 36/0083; H04W 36/08; H04W 36/14;
(Continued)

(56) References Cited

U.S. PATENT DOCUMENTS 5,572,221 A * 11/1996 Marlevi ................ H04W 28/18
342/452
5,825,759 A * 10/1998 Liu ......................... H04W 8/06
370/331
(Continued)

FOREIGN PATENT DOCUMENTS

WO 2013133669 A1 9/2013

OTHER PUBLICATIONS

EP Search Report and Written Opinion for EP 15201914, dated Jun. 22, 2016, 10 pages.

*Primary Examiner* — Nizar N Sivji
(74) *Attorney, Agent, or Firm* — Lowenstein Sandler LLP

(57) ABSTRACT

According to an example, a communication terminal is described comprising a determiner configured to determine cell search control information including at least a radio access technology to be searched for, a search duration, a number of search iterations, a number of antennas to be used for the search and based on at least one of information about the current radio conditions that the communication terminal is experiencing, position of the terminal, historical information about the presence of the radio cells at the position of the communication terminal, communication terminal attach history in terms of moving from some specific RATs/cells to other specific RATs/cells, proximity sensors' information and a transceiver configured to perform a cell search based on the determined cell search control information.

20 Claims, 6 Drawing Sheets

(51) Int. Cl.
- *H04W 36/30* (2009.01)
- *H04W 36/32* (2009.01)
- *H04W 48/04* (2009.01)
- *H04W 48/16* (2009.01)
- *H04W 84/04* (2009.01)

(52) U.S. Cl.
CPC ...... *H04W 36/0094* (2013.01); *H04W 36/245* (2013.01); *H04W 48/04* (2013.01); *H04W 84/042* (2013.01)

(58) Field of Classification Search
CPC ......... H04W 36/0061; H04W 72/1215; H04W 84/045; H04W 76/02; H04W 88/08; H04B 7/0805; H04B 7/0413; H04B 7/0608; H04B 7/0814; H04B 17/309; H04B 17/318; H04B 17/382; H04B 7/0691

See application file for complete search history.

(56) References Cited

U.S. PATENT DOCUMENTS

| | | | |
|---|---|---|---|
| 2006/0234701 A1* | 10/2006 | Wang | H04W 8/08 455/432.1 |
| 2007/0091785 A1* | 4/2007 | Lindoff | H04J 11/0069 370/203 |
| 2007/0281746 A1* | 12/2007 | Takano | H04B 7/0417 455/562.1 |
| 2011/0124336 A1 | 5/2011 | Ishii | |
| 2012/0322447 A1 | 12/2012 | Ramachandran et al. | |
| 2013/0040644 A1* | 2/2013 | Lin | H04W 64/006 455/436 |
| 2013/0072189 A1 | 3/2013 | Cheng et al. | |
| 2014/0140424 A1 | 5/2014 | Clevorn Thorsten | |
| 2015/0065143 A1* | 3/2015 | Hsu | H04W 36/0061 455/437 |
| 2016/0112908 A1* | 4/2016 | Chin | H04W 36/0088 455/436 |

\* cited by examiner

COMMUNICATION TERMINAL AND METHOD FOR PERFORMING A CELL SEARCH

RELATED APPLICATION

This application claims priority to European Patent Application No. 15201914.7, filed Dec. 22, 2015, the contents of which are hereby incorporated by reference herein.

TECHNICAL FIELD

Embodiments described herein generally relate to communication terminals and methods for performing a cell search.

BACKGROUND

Modern wireless communication devices typically support the usage of different radio access technologies such as LTE (Long Term Evolution) and UMTS (Universal Mobile Telecommunication System) and may perform a handover or a cell reselection from a current radio cell operated according to one radio access technology to another radio cell operated according to a different radio access technology. However, this process requires a cell search which requires time and power. While the speed of a cell search may for example be increased by using multiple antennas, the usage of multiple antennas may in turn increase the power consumption. Accordingly, efficient approaches for controlling a cell search, e.g. with regard to the number of antennas to be used, are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
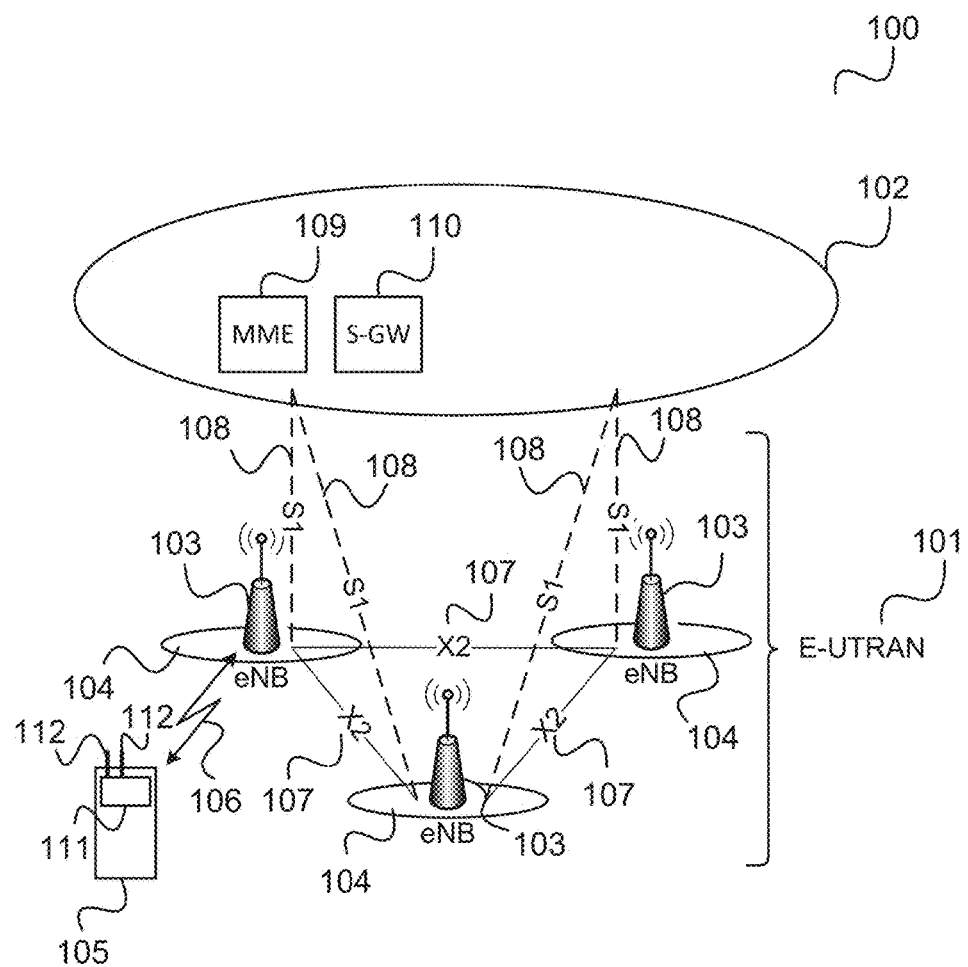
FIG. 1 shows a communication system, e.g. an LTE (Long Term Evolution) communication system.

FIG. 1 shows a communication system 100, e.g. an LTE (Long Term Evolution) communication system.

The communication system 100 includes a radio access network (e.g. an E-UTRAN, Evolved UMTS (Universal Mobile Communications System) Terrestrial Radio Access Network according to LTE) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment, or MS, mobile station) 105 located in a mobile radio cell 104 may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109, and a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

The radio access network 101 and the core network may support communication according to various communication technologies, e.g. mobile communication standards. For example, each base station 103 may provide a radio communication connection via the air interface between itself and the mobile terminal 105 according to LTE, UMTS, GSM (Global System for Mobile Communications), EDGE (Enhanced Data Rates for GSM Evolution) radio access. Accordingly, the radio access network 101 may operate as an E-UTRAN, a UTRAN, a GSM radio access network, or a GERAN (GSM EDGE Radio Access Network). Analogously, the core network 102 may include the functionality of an EPC, a UMTS core network or a GSM core network.

For radio communication via the air interface 106, the mobile terminal 105 includes a radio transceiver 111 and, in this example, multiple antennas 112.

The mobile terminal 105 may be within the coverage area of more than one mobile communication networks which may operate according to the same RAT (radio access technology) or according to different RATs. This is illustrated in FIG. 2.

Figure 2:
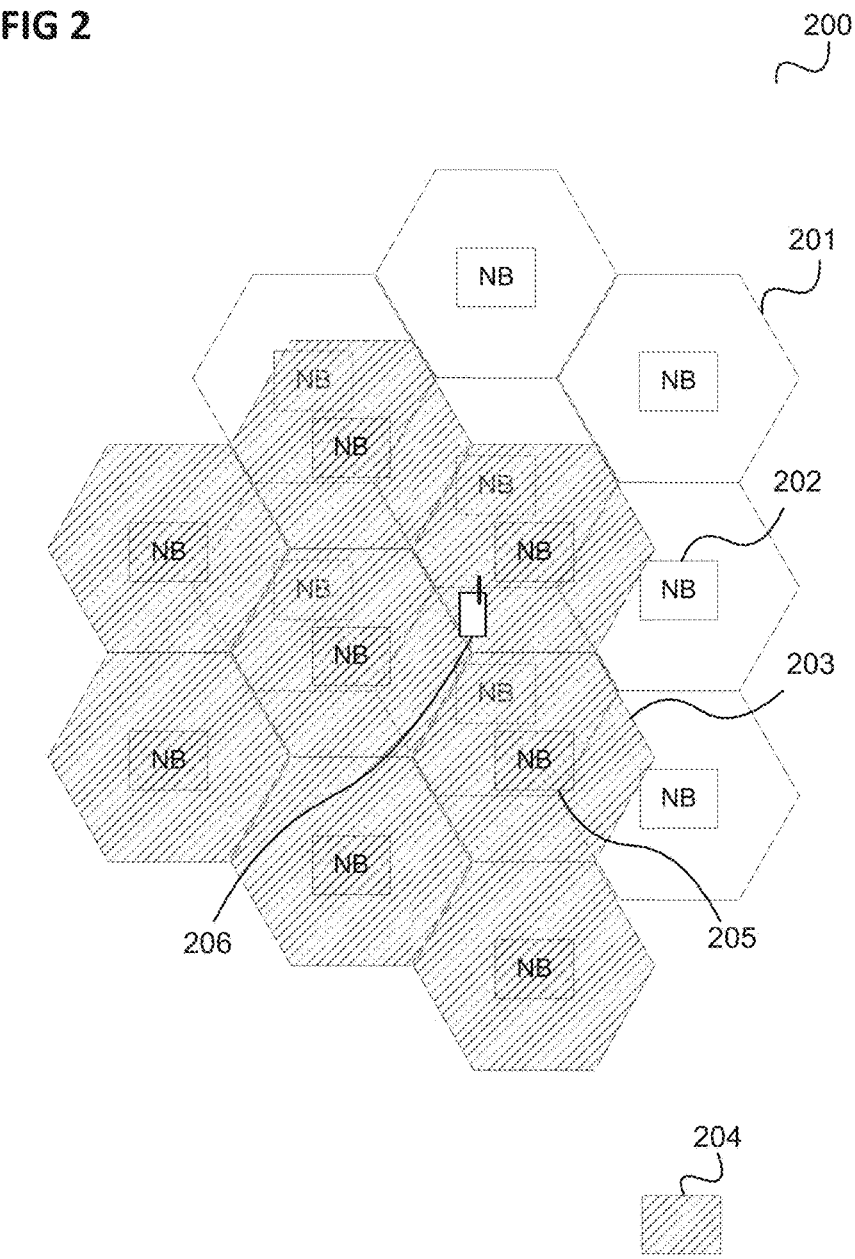
FIG. 2 shows a radio cell arrangement including two communication networks.

FIG. 2 shows a radio cell arrangement 200 including two communication networks.

The radio cell arrangement 200 includes a first plurality of radio cells 201 (shown without hatching) operated by a plurality of first base stations 202 of a first communication network (e.g. LTE base stations eNB), and a second plurality of radio cells 203 indicated by a hatching 204 operated by a plurality of second base stations 205 of a second communication network (e.g. of a different RAT, e.g. UMTS base stations NB).

As illustrated, the second plurality of radio cells 203 overlaps the first plurality of radio cells 201 such that a mobile terminal 206, e.g. corresponding to mobile terminal 105, located in the overlapping area may connect to both the first communication network and the second communication network, e.g. may both register with a base station 202 of the first communication network and a base station 205 of the second communication network. In particular, the mobile terminal 206 may perform a handover or a reselection from one cell of one of the communication networks to another cell of the communication network (i.e. within the same RAT) or to a radio cell of the other communication network (i.e. perform an inter-RAT handover).

Mobility mechanisms in both RAT and inter-RAT handovers require finding and measuring the cells on different RATs quickly. Smooth execution of such mechanisms typically directly leads to good user experience. Sustained battery life for mobile devices is typically a very important parameter. Running many background tasks (cell searches, power measurements etc.) exhaustively drains the battery power quickly destroying the user experience.

A modern wireless device may, as mentioned above for the mobile terminal 206, be able to communicate with multiple RATs. Further, as described above for mobile terminal 105, it may be equipped with multiple antennas. In many scenarios, when a device is moving to the border of the coverage regions of a specific RAT or due to some network (NW) decisions (i.e. radio access network 101) as a result of load balancing and access control, the device may receive a NW request to find cells on another RAT and try to attach. Upon reception of this request, the device has to find the cells on the new RAT, make measurements of some key indicators and report to the NW.

Typically, one of the biggest problems that modern wireless devices face is power consumption. To stay economical and have longer battery life, devices may use the mechanisms such as switching on only a single antenna for communication as much as possible on some RATs. On the other hand, devices typically use all antennas while operating on RATs such as e.g. 4G (LTE) causing quick battery drain, because more antennas improve the performance.

In the following, an approach is described which allows improving the speed and performance of cell search procedure on different RATs but also allows reducing the average power consumption. The term "cell search" and "cell search procedure" is used to refer to the combined procedure of the measurement, evaluation and detection process of one or more radio cells. This can be seen to be very tightly related to the cell selection or reselection process because the mobile terminal typically goes through the cell search procedure first before it goes through the cell selection.

The improvement of the speed and performance of the cell search procedure as well as the reduction of the power consumption can be achieved through a judicious choice of parameters defining the cell search and measurement activities (such as prioritizing certain RATs/cells for search over others, activating a certain number of antennas at the mobile device, choice of appropriate length of search/measurement procedures) based upon some power probe tasks, location information and history of known cells whenever applicable.

According to various examples, a trade-off of cell search/measurement performance and power consumption for the mobile device is achieved. This may be enabled through: (i) prioritizing the RATs/cells based upon history and location information and (ii) choosing the search parameters (e.g. the active antennas, the length how search tasks are performed) as a function of power probe, location and device history and possibly other information.

Inter-RAT hand-overs are hard handovers and a challenge for ongoing communication calls. The usage of the approach described in the following may result in faster and more accurate acquisition of information for the cells on the destined desired RAT. In this way, a wireless device may gather quickly this information and relay the information to the NW for faster handover decisions. Furthermore, since less measurement gaps would in general be required per RAT, the allocation of those gaps can be shared in a more suitable way between different RATs if the mobile device has to potentially search cells on them. This can save many call drops which are a big nuisance and thus user experience can be improved.

Another important benefit may be with regard to power consumption when the numbers of allocated measurement gaps is reduced. Activating more antennas consumes more power per unit time but due to activation of more antennas, cell search and measurement time can be reduced and thus, total energy consumed in the cell search and measurement operation can be reduced.

The approach described in more detail in the following can be seen to operate on the performance-power consumption trade-off for cell search and measurement processes, in contrast to a conventional approach where a device (strictly) operates on a single antenna to save battery power, which compromising mobility performance, and a conventional approach where a device makes exhaustive multi-antenna searches/measurements, which causes fast battery drain. According to various examples as described in the following, side information (e.g. device history, location information and power probe information) is exploited to prioritize RATs/cells and judiciously choosing active antennas and search parameters allows a device to outperform the above-mentioned conventional approaches in terms of performance-power consumption and thus to improve user experience.

In the following, an example is described in more detail. It is assumed that a wireless communication device, e.g. corresponding to the mobile terminal 206, is equipped with a multi-RAT modem which means that it is able to communicate by means of different wireless standards (i.e. different RATs). Further, it is assumed that the device 206 has an ongoing communication (such as a call) on a specific wireless standard (RAT), e.g. by means of one of the radio cells 201 of a first communication network using a first RAT (e.g. UMTS) but faces the need to move to a different RAT, e.g. to move to a radio cell 203 of a second communication network using a second RAT different from the first RAT (e.g. to LTE). This may for example happen in one of the following scenarios:

1. The device 206 has reached the borders of the coverage region of the specific RAT it is connected to, i.e. the first communication network.
2. For load balancing reasons, the network side decides to move this device 206 to a different RAT.
3. The device owner has bought a subscription such that it has a network assisted bias for a particular RAT (an example could be an expensive package where the network serves the device through the best RAT, another example on the opposite extreme could be a budget package where the network forces the device 206 to a RAT with voice-call only services)

Although most current wireless devices are equipped with multiple antennas, most devices, while operating on 2G/3G (e.g. GSM and UMTS), try to turn on the minimum number of antennas to enjoy a longer battery life, thus in many cases a single antenna is active on many such devices. The situation is typically opposite for devices operating on 4G (LTE). The de facto standard here is to use multiple antennas.

Now, if the device 206 is camped or connected with a single active antenna 112 on the first communication network and receives a request to move to the second communication network, e.g. due to one of the above scenarios, it has to quickly find cells 203 and make measurements on the cells 203 of the second communication network. However, the cell search capability depends heavily on the number of active antennas of the device 206. In particular, this plays a major role in fading channel conditions. This performance difference has a large impact on cell search speed.

If only a single antenna 112 of the device 206 is active and the cells on the new RAT are not very strong, the device may need to run the cell search procedure multiple times. This not only can be problematic for an ongoing communication but also it may result in large power consumption during the cell search procedure.

On the contrary, if multiple antennas 112 are activated by default for all the search/measurement tasks, the power consumption may be exorbitant.

Therefore, according to various examples, power probe information (e.g. the RSSI (Received Signal Strength Indication) value per antenna 112) is combined with other side information (such as device recent history and location information) to operate on the trade-off of performance and power consumption.

Figure 3:
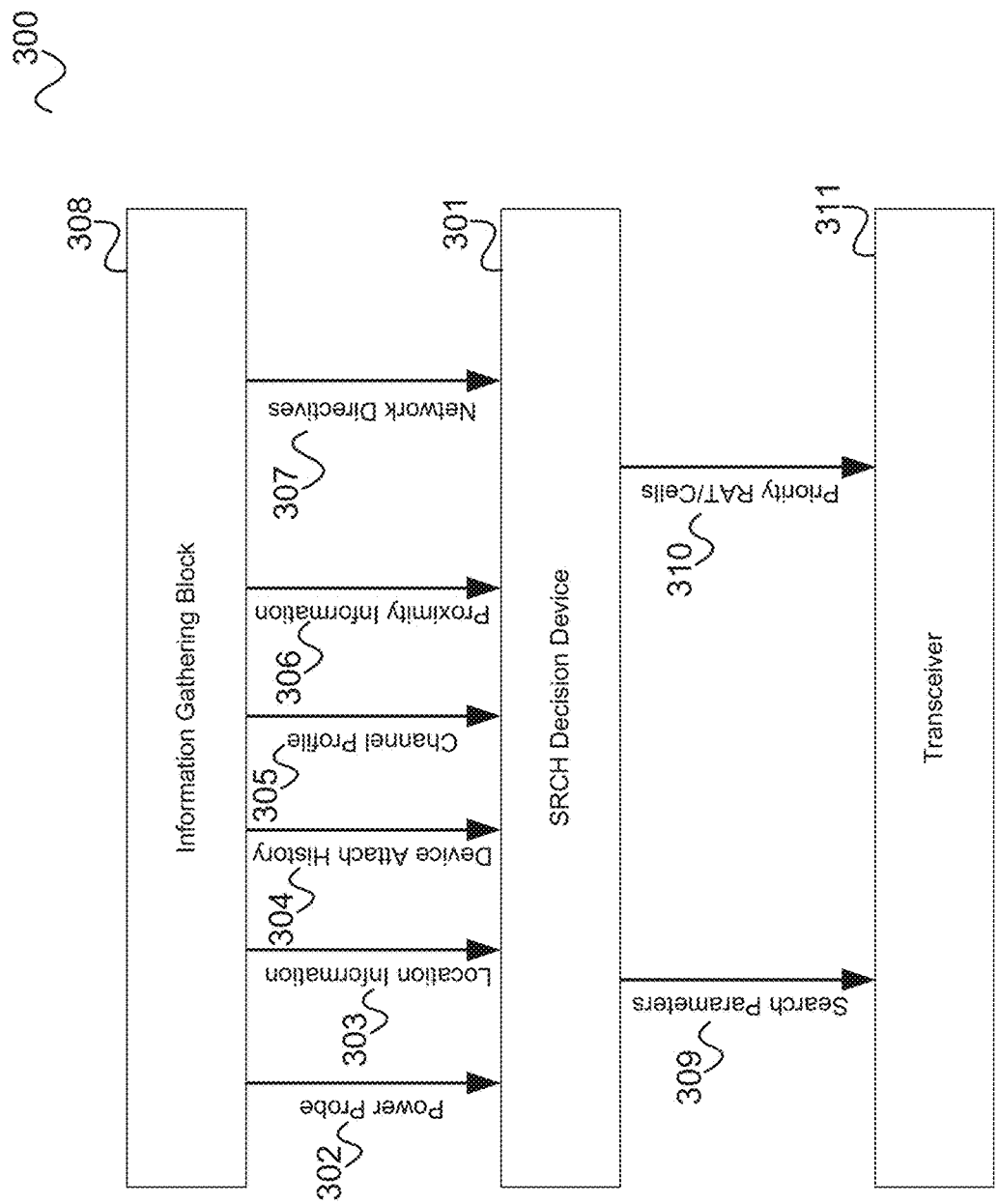
FIG. 3 shows components of a communication terminal related to cell search.

This is illustrated in FIG. 3.

FIG. 3 shows components of a communication terminal 300 related to cell search.

The communication terminal 300 includes a SRCH (search) decision device 301 which receives information 302 to 307 from an information gathering block 308 (e.g. gathering information form information sources such as memory, sensors etc.) and decides, based on the received information, which search parameters 309 to use and which cells or cells of which RAT should be searched with priority 310. The search parameters for example include the antennas to be used for the search (or at least the number of antennas to be used for the search), the search duration (e.g. 30 ms or 100 ms) and the number of search iterations. The SRCH decision device for example provides this generated cell search control information 309, 310 to the transceiver 311 of the terminal 300, e.g. corresponding to transceiver 111, which performs a cell search based on the cell search control information 309, 310.

For example, the terminal 300 may exploit device history information 304 and location information 303 (which are typically available in a modern mobile communication device) to provide a benefit for the cell search. An example is a scenario where the terminal 300 attaches to a femto cell at home (or similarly the office) of its user where the terminal 300 frequently attaches. Whenever user moves away from home (and thus the femto cell), the terminal 300 may for example need to connect to a cell of a certain operator deployed communication network in the vicinity of the user's home. The terminal 300 can exploit this historical information (i.e. the information that the home femto cell is typically followed by certain communication network radio cell) and location information (device is at home when attached to the femto cell, communication network is near) next time when it leaves the femto cell to directly search the particular cell of the particular communication network (and the corresponding RAT) with the optimal number of antennas and search duration to avoid exhaustive search delays and consequential power penalty.

Similarly, the terminal may make use of such historical and location information when it is connected to a WIFI network to which the device connects at home or in office and it knows from the past that whenever it moves away from this home or office area, it typically connects to a certain cell (or one of a plurality of cells) using a certain RAT.

The SRCH decision device may accordingly set the cell search control parameters 309, 310, e.g. set a high cell search priority for a RAT or a cell which is typically visited after leaving a certain area when the SRCH decision device detects that this area is being left.

Apart from device attach history information 304 and location information 303, power probe values 302 (e.g. in the form of an RSSI value for each antenna 112) may play a vital role in achieving an efficient the cell search performance and power consumption trade-off.

In the following, for an example of RAT Prioritization with Power Probe information 302, it is assumed that side information such as device history 304, location information 303 or NW assisted information (e.g. network directives 307) is available and the mobile device 300 is moving out of the coverage of a current communication network and has to quickly choose new cells (and a new RAT) to attach to. The SRCH decision device may for example use power probe values 302 (e.g. RSSI values from the antennas obtained in an RSSI scan in a certain band) in the following way:

If the RSSI scan shows significantly high power (and uniform power on 3G bandwidth if narrowband scan is done), this indicates the potential presence of 3G cells and the SRCH decision device may set a high priority of 3G cells.

If the RSSI scan shows strong variations over different frequencies (with interval of 2G bandwidths), this points out the presence of 2G cells in this band and the SRCH decision device may set a high priority of 2G cells.

For an example of choosing active antennas and search parameters 309 with Power Probe information 302, it is assumed that the SRCH decision device has already chosen the RAT to be searched for (e.g. from power probe information, side information or NW directed) and wants now to choose an (ideally optimum) active antenna setting and further search parameters 309 to achieve an efficient performance-power trade-off. It is further assumed that cell search sensitivity and detection probability for different search parameters (such as different numbers of active antennas) are also known to the SRCH decision device. The SRCH decision device may for example use the power probe values 302 in the following way:

A1) If the RSSI scan shows significantly high power (e.g. above than a predetermined threshold $P_{HIGH}$), the SRCH decision device may decide that even a short-length single antenna search is sufficient to detect the cell from sensitivity perspective.

A2) If the RSSI scan shows very poor results (e.g. below a predetermined threshold $P_{LOW}$) to the extent that the search detection probability is close to zero the SRCH decision device may decide that it is better not to explore the scanned band for search purposes as this would cause waste of time and power.

A3) If the RSSI scan shows medium power values (e.g. below $P_{HIGH}$ and above $P_{LOW}$) indicating the presence of a relatively weak cell, the SRCH decision device may decide to use an RxDiv search (i.e. a search using multiple antennas) with appropriate length to make the search faster and more sensitive. With respect to the additional power consumption of an RxDiv search it is shown in an example below that an RxDiv search with appropriate parameters may be more sensitive and power efficient compared to a single antenna search.

It should be noted that in case power probe values are not available, the SRCH decision device can request them explicitly or it may run a short multi-antenna search during which RSSI values per antenna can be obtained (e.g. from the transceiver 311).

Beyond the basic power/RSSI levels the decision circuit 301 may take further derived parameters into account. For example, with antenna specific values (e.g. power, RSSI or some other quality indicator) the SRCH decision device may for example check whether there is a strong antenna imbalance which results in a certain antenna not contributing (significantly) to the performance. If this is the case, the decision circuit 301 may exclude this antenna from measurements to save power without an impact on search performance.

The antenna quality detection can be e.g. further supported by proximity sensor information 306, e.g. provided by a proximity sensor in the device 300, e.g. a sensor in a phone detecting a desk or a hand covering an antenna, antenna impedance/detuning detection information (e.g. measurements in the RF which detects a hand touching an outside metal antenna and detune it) etc.

The decision circuit 301 may detect a low performing antenna (i.e. an antenna imbalance) based on the usage of the old RAT (i.e. the RAT used before the cell search) and may decide which antennas to use for the search based on a table or mechanism which determines whether an antenna used for the old RAT would also be used for the new RAT (i.e. the RAT for which cells are searched) since, e.g., high and low band antennas may be different. Also, the decision circuit 301 may consider the type of imbalance detection, e.g. by means of power measurements or by means of proximity sensor, when deciding whether an imbalance on the antennas of the old RAT is relevant for the new RAT.

If the communication terminal 300 performs measurements anyway on the new RAT, the antenna imbalance can be detected there (potentially again in combination with other inputs like from a proximity sensor). For example, the decision circuit 301 may instruct the transceiver 311 to perform a first measurement with all antennas and, if a low performing antenna is detected from the first measurement, the decision circuit 301 may excluded it from future measurements to save power.

Another observation the decision circuit 301 may take into account for the antenna selection is the expected fading channel profile 305. For example, depending on the length of the fading dips the decision circuit 301 may decide that more antennas should be used to provide an improvement by compensating potentially long fading dips on one antenna, or that a single antenna is enough because the fading dips are this short that also a single antenna can cover good sections of the fading profile during a measurement interval. Short fading dips usually relate to a fast moving device, long fading dips to a slow moving device. Thus, fading profile observations from the old RAT are a good indicator that the decision circuit 301 may use, and the decision circuit 301 may support these observations by further indicators like GPS (Global Positioning System) information, motion sensor information, location information, usage information (e.g. terminal is used in a car), or other velocity information.

The decision circuit 301 may further take network directives 307 into account, e.g. a priority of a certain RAT.

In the following, an example is given how the principles described above can be helpful in a practical scenario. As an example scenario, it is assumed that the communication terminal 300 is camped on or connected to a first communication network using a first radio access technology RAT1 and is asked by the network to move to a second communication network using a second radio access technology RAT2. RAT1 corresponds to LTE (4G) and RAT2 corresponds to W-CDMA (3G). The network sends a cell search and measurement command to the communication terminal 300 for RAT2.

Figure 4:
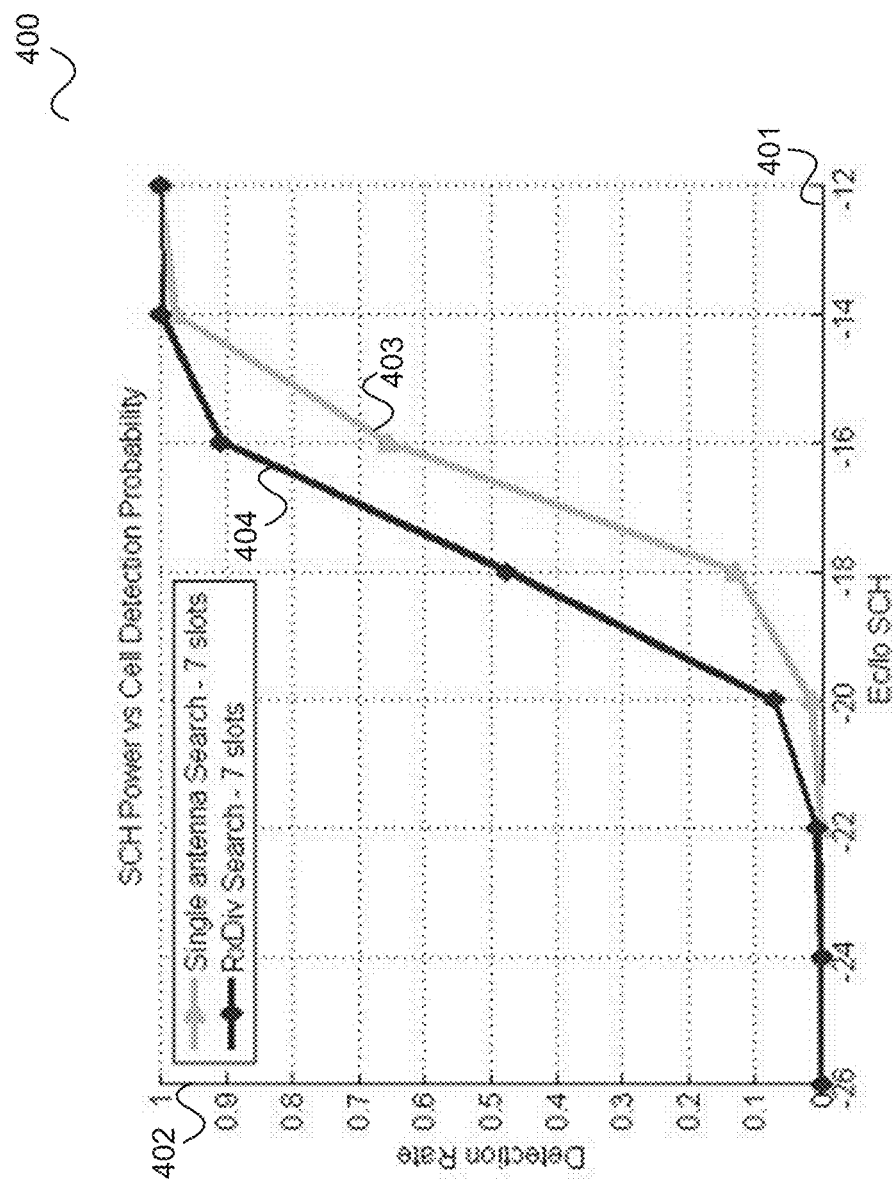
FIG. 4 shows the cell detection probability on RAT2 using a single receive antenna and using dual receive antenna under additive Gaussian noise only channel conditions.

FIG. 4 shows the cell detection probability on RAT2 using a single receive antenna and using dual receive antenna under additive Gaussian noise only channel conditions.

Synchronization Channel (SCH) power increases from left to right along the horizontal axis 401 and detection rate increases from bottom to top along the vertical axis 402. A first graph 403 indicates the performance of the single antenna search and a second graph 404 indicates the performance of the dual antenna search.

In this example, for simplicity, the focus is on the power probe values 302 as indicator and the three possible search approaches A1 to A3 given above in context of the usage of power prove values 302, but it may be analogously adapted or extended to the other parameters like antenna imbalance etc.

From FIG. 4, it can be seen that if power probe values 302 (RSSI values) are such that they indicate an SCH Ec/Io of greater than −14 dB, the detection probability for both single antenna search and RxDiv search is very high. In such a case, even short single antenna search would detect the cell quickly with minimal power consumption and the decision circuit 301 may thus use a single antenna search as under A1 above.

On the other hand, if power probe values indicate an SCH Ec/Io region less than −22 dB, the search would not find the cell with high probability and the decision circuit 301 may decide that it is better to search on other bands where the probability of finding the cells is larger as under A2 above.

For the power probe values between the two extreme values (i.e. between −22 dB and −14 dB), the huge gains in detection probability which kick in with activation of second antenna are clearly visible from FIG. 4. The following calculation shows the speed advantage:

Cell Detection probability at SCH $Ec/Io$ of −16 dB=0.91 with RxDiv

Cell Detection probability at SCH $Ec/Io$ of −16 dB=0.655 with single antenna

If the single antenna search is run twice, the detection probability would increase to $1-(1-0.655)^2=0.88$. So although search time becomes double for two iterations, the performance is still worse than the single iteration of RxDiv based search.

From a power perspective, the following can be noted: the overall modem power consumption for an RxDiv search leads to an increase in the range of 30% to 60% compared to single antenna usage. Staying conservative, it can be assumed that RxDiv consumes 50% more power compared to single antenna usage.

Let 1 slot power consumption of single antenna active device=x, then 1 iteration of cell search (7 slots) consumes power=7x 2 iterations of cell search (7 slots) consumes power=14x 1 iteration of RxDiv cell search consumes power=7 slots (1.5x)=10.5x This shows that not only cell search speed and performance improve but the device also becomes power efficient by activating more receive antennas, i.e. the SRCH decision device may decide to use a plurality of antennas for the search according to A3 above.

It should be note that FIG. 4 illustrates the decision making in the context of 3G but its principles are general and equally valid for other RATs like LTE (4G) or GSM (2G).

Figure 5:
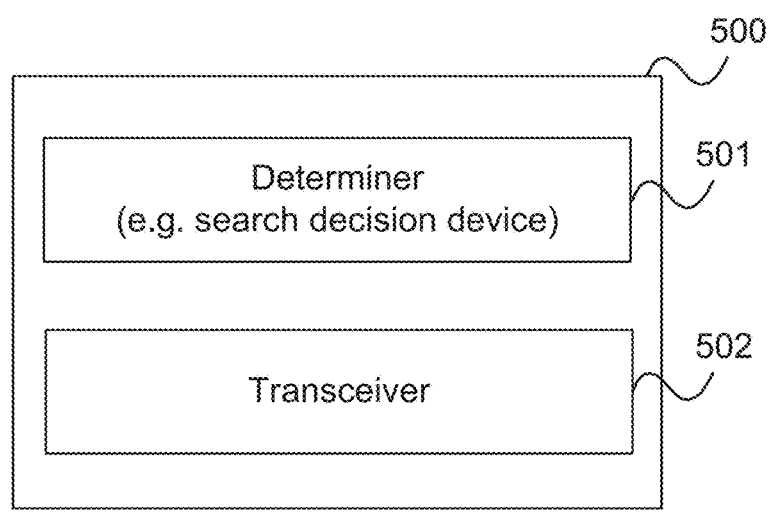
FIG. 5 shows a communication terminal.

In summary, according to various examples, a communication terminal is provided as illustrated in FIG. 5.

FIG. 5 shows a communication terminal 500.

The communication terminal 500 includes a determiner (e.g. a search decision device) 501 configured to determine cell search control information including at least one of a radio access technology to be searched for, a search duration, a number of search iterations, a number of antennas to be used for the search based on at least one of information about radio conditions at a position of the communication terminal and historical information about presence of radio cells at the position of the communication terminal and a transceiver 502 configured to perform a cell search a transceiver configured to perform a cell search based on the determined cell search control information.

In other words, according to various examples, a communication terminal determines how to perform a cell search in terms of search duration, search iterations, antennas to be used and radio access technology (or cell) to be searched (e.g. with priority over another radio access technology) based on information such as information about the radio conditions (in other words the radio environment), location information, proximity sensor information and historical information (e.g. search profile information of the communication terminal, device attach history and attach history combined with location information).

The length of one search iteration is for example defined as search duration "sd" (could range from ~10 m-sec to 100 m-sec in typical cases). Then in specific settings, this search may be run for multiple iterations (e.g. 1 to 5 iterations), e.g. accordingly a parameter "it" specifying the number of iterations. Then the overall length of the search procedure becomes "it*sd". The performance of the search procedure also depends upon the choice of it and sd. For an overall length of search procedure of 100 m-seconds, three example settings could be i. 5 iterations of 20 m-sec search
 ii. 2 iterations of 50 m-sec search
 iii. 1 iteration of 100 m-sec search Now in different radio and channel conditions, one of the above example settings will perform better than the others. For example, the determiner 501 chooses the suitable setting as part of the SRCH control information and may for example pass it to a controller for controlling the transceiver to perform a cell search accordingly.

The search control information includes one or more radio cells operating on the radio access technology to be searched for, e.g. radio cells of a cellular mobile communication network (e.g. a 2G, 3G or 4G cellular network). For example, these may be other radio cells than cells of a WLAN.

The information about radio conditions at a position of a communication terminal is for example information about the current radio conditions that the communication terminal is experiencing.

The components of the communication terminal (e.g. the determiner and the transceiver) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 6:
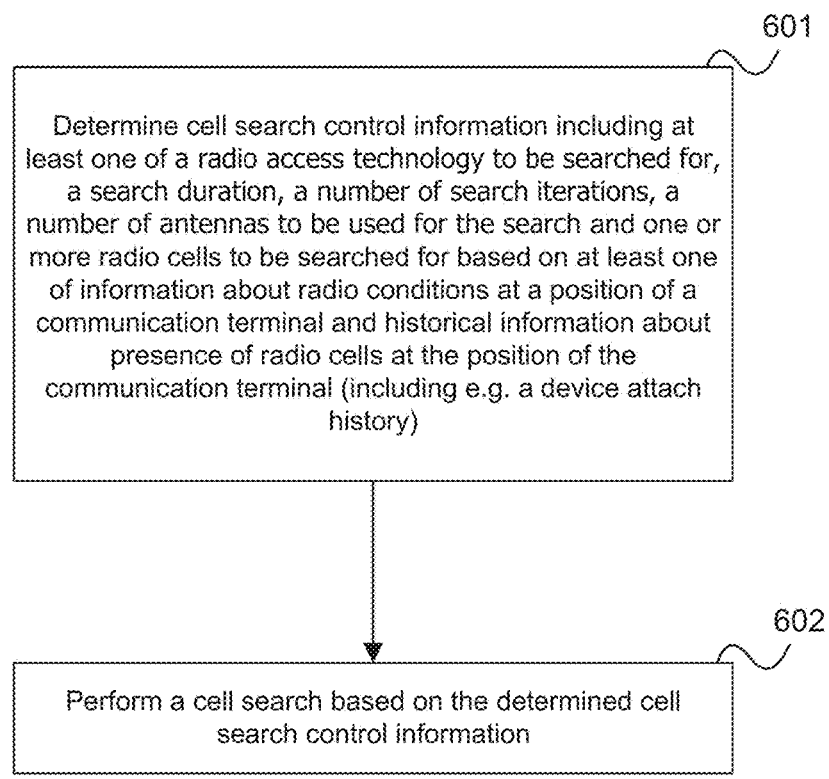
FIG. 6 shows a flow diagram illustrating a method for performing a cell search.

The communication terminal 500 for example carries out a method for performing a cell search as illustrated in FIG. 6.

FIG. 6 shows a flow diagram 600 illustrating a method for performing a cell search, for example carried out by a communication terminal.

In 601, the communication terminal determines cell search control information including at least one of a radio access technology to be searched for, a search duration, a number of search iterations, a number of antennas to be used for the search based on at least one of information about radio conditions at a position of the communication terminal and historical information about presence of radio cells at the position of the communication terminal (and possibly side information such as GPS data, proximity sensor data etc.).

In 602, the communication terminal performs a cell search based on the determined cell search control information.

The following examples pertain to further embodiments.

Example 1 is a communication terminal as illustrated in FIG. 5.

In Example 2, the subject matter of Example 1 may optionally include a controller configured to control the transceiver to perform a cell search based on the determined cell search control information.

In Example 3, the subject matter of Example 1 may optionally include the radio situation comprising a reception strength in a band corresponding to a predetermined radio access technology.

In Example 4, the subject matter of any one of Examples 1-3 may optionally include the determiner being configured to determine the number of antennas to be used for the search based on whether the reception strength being above a first predetermined threshold.

In Example 5, the subject matter of Example 4 may optionally include the determiner being configured to set the number of antennas to be used for the search to a single antenna if the reception strength is above the first predetermined threshold and to set the number of antennas to be used for the search to multiple antennas if the reception strength is below the first predetermined threshold.

In Example 6, the subject matter of any one of Examples 1-5 may optionally include the determiner being configured to set that a radio access technology is to be searched if the reception strength in a band corresponding to the radio access technology is above a second predetermined threshold and to set that another radio access technology is to be searched if the reception strength in a band corresponding to the radio access technology is below the second predetermined threshold.

In Example 7, the subject matter of any one of Examples 1-6 may optionally include the radio situation comprising a channel profile in a band corresponding to a predetermined radio access technology.

In Example 8, the subject matter of any one of Examples 1-7 may optionally include the radio situation comprising information about a performance of an antenna of the communication terminal.

In Example 9, the subject matter of any one of Examples 1-8 may optionally include the cell search control information including whether an antenna of the communication terminal is to be used for the search and the determiner being configured to set that the antenna of the communication terminal is to be used for the search only if its contribution to the reception performance lies above a third predetermined threshold.

In Example 10, the subject matter of any one of Examples 1-9 may optionally include the historical information about presence of radio cells comprising information about radio cells to which the communication terminal has previously connected at the position of the communication terminal.

In Example 11, the subject matter of any one of Examples 1-10 may optionally include the historical information about presence of radio cells comprising attach history information in terms of moving from some specific radio access technologies or cells to other specific radio access technologies or cells.

In Example 12, the subject matter of any one of Examples 1-11 may optionally include a position determiner configured to determine the position of the communication terminal.

In Example 13, the subject matter of Example 12 may optionally include the position determiner being configured to determine the position of the communication terminal based on a radio cell to which the communication terminal is being connected.

In Example 14, the subject matter of any one of Examples 1-13 may optionally include the cell search being a cell search for a selection of a cell operating according to a radio access technology or a cell search for a reselection or a handover from a cell of a first communication network operating according to a first radio access technology to a different cell of same or different communication network operating according to the same or different radio access technology compared to the first radio access technology.

In Example 15, the subject matter of Example 14 may optionally include the first radio access technology and the second radio access technology being cellular mobile communication network technologies.

In Example 16, the subject matter of any one of Examples 14-15 may optionally include the first radio access technology and the second radio access technology being each one of a 2G radio access technology, a 3G radio access technology and a 4G radio access technology.

In Example 17, the subject matter of any one of Examples 1-16 may optionally include each search iteration corresponding to a search process in a predetermined number of time slots.

In Example 18, the subject matter of any one of Examples 1-17 may optionally include the search control information including one or more radio cells operating on the radio access technology to be searched for.

In Example 19, the subject matter of any one of Examples 1-18 may optionally include the determiner being configured to determine the cell search control information further based on at least one of proximity sensor information and information about the position of the communication terminal.

Example 20 is a method for performing a cell search as illustrated in FIG. 6.

In Example 21, the subject matter of Example 20 may optionally include the radio situation comprising a reception strength in a band corresponding to a predetermined radio access technology.

In Example 22, the subject matter of any one of Examples 20-21 may optionally include determining the number of antennas to be used for the search based on whether the reception strength being above a first predetermined threshold.

In Example 23, the subject matter of Example 22 may optionally include setting the number of antennas to be used for the search to a single antenna if the reception strength is above the first predetermined threshold and setting the number of antennas to be used for the search to multiple antennas if the reception strength is below the first predetermined threshold.

In Example 24, the subject matter of any one of Examples 20-23 may optionally include setting that a radio access technology is to be searched if the reception strength in a band corresponding to the radio access technology is above a second predetermined threshold and setting that another radio access technology is to be searched if the reception strength in a band corresponding to the radio access technology is below the second predetermined threshold.

In Example 25, the subject matter of any one of Examples 20-24 may optionally include the radio situation comprising a channel profile in a band corresponding to a predetermined radio access technology.

In Example 26, the subject matter of any one of Examples 20-25 may optionally include the radio situation comprising information about a performance of an antenna of the communication terminal.

In Example 27, the subject matter of any one of Examples 20-26 may optionally include the cell search control information including whether an antenna of the communication terminal is to be used for the search and may optionally include setting that the antenna of the communication terminal is to be used for the search only if its contribution to the reception performance lies above a third predetermined threshold.

In Example 28, the subject matter of any one of Examples 20-27 may optionally include the historical information about presence of radio cells comprising information about radio cells to which the communication terminal has previously connected at the position of the communication terminal.

In Example 29, the subject matter of any one of Examples 20-28 may optionally include the historical information about presence of radio cells comprising attach history information in terms of moving from some specific radio access technologies or cells to other specific radio access technologies or cells.

In Example 30, the subject matter of any one of Examples 20-29 may optionally include determining the position of the communication terminal.

In Example 31, the subject matter of Example 30 may optionally include determining the position of the communication terminal based on a radio cell to which the communication terminal is being connected.

In Example 32, the subject matter of any one of Examples 20-31 may optionally include the cell search being a cell search for a selection of a cell operating according to a radio access technology or a cell search for a reselection or a handover from a cell of a first communication network operating according to a first radio access technology to a different cell of same or different communication network operating according to the same or different radio access technology compared to the first radio access technology.

In Example 33, the subject matter of Example 32 may optionally include the first radio access technology and the second radio access technology being cellular mobile communication network technologies.

In Example 34, the subject matter of any one of Examples 32-33 may optionally include the first radio access technology and the second radio access technology being each one of a 2G radio access technology, a 3G radio access technology and a 4G radio access technology.

In Example 35, the subject matter of any one of Examples 20-34 may optionally include each search iteration corresponding to a search process in a predetermined number of time slots.

In Example 36, the subject matter of any one of Examples 20-35 may optionally include the search control information including one or more radio cells operating on the radio access technology to be searched for.

In Example 37, the subject matter of any one of Examples 20-36 may optionally include determining the cell search control information further based on at least one of proximity sensor information and information about the position of the communication terminal.

Example 38 is a computer readable medium having recorded instructions thereon which, when executed by a processor, make the processor perform a method for performing a cell search according to any one of Examples 20 to 37.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A communication terminal comprising:
   a determiner configured to determine cell search control information including at least one of a radio access technology (RAT) to be searched for, a search duration, a number of search iterations, or a number of antennas to be used for the search based on information about radio conditions at a position of the communication terminal and historical information about presence of radio cells at the position of the communication terminal, wherein the historical information about presence of radio cells comprises information about radio cells to which the communication terminal has previously connected at the position of the communication terminal; and
   a transceiver, coupled to the determiner, and configured to perform a cell search based on the determined cell search control information to identify a radio cell of the RAT to be searched for, and to cause the communication terminal to move a connection from a previous radio cell of a previous RAT to the radio cell of the RAT to be searched for.

2. The communication terminal of claim 1, further comprising a controller configured to control the transceiver to perform a cell search based on the determined cell search control information.

3. The communication terminal of claim 1, wherein the radio conditions comprise a reception strength in a band corresponding to a predetermined radio access technology.

4. The communication terminal of claim 3, wherein the determiner is configured to determine the number of antennas to be used for the search based on whether the reception strength is above a first predetermined threshold.

5. The communication terminal of claim 4, wherein the determiner is configured to set the number of antennas to be used for the search to a single antenna if the reception strength is above the first predetermined threshold and to set the number of antennas to be used for the search to multiple antennas if the reception strength is below the first predetermined threshold.

6. The communication terminal of claim 3, wherein the determiner is configured to set that a radio access technology is to be searched if the reception strength in the band corresponding to the radio access technology is above a second predetermined threshold and to set that another radio access technology is to be searched if the reception strength in a band corresponding to the radio access technology is below the second predetermined threshold.

7. The communication terminal of claim 1, wherein the radio conditions comprise a channel profile in a band corresponding to a predetermined radio access technology.

8. The communication terminal of claim 1, wherein the radio conditions comprise information about a performance of an antenna of the communication terminal.

9. The communication terminal of claim 1, wherein the cell search control information includes whether an antenna of the communication terminal is to be used for the search and the determiner is configured to set that the antenna of the communication terminal is to be used for the search only if its contribution to a reception performance lies above a third predetermined threshold.

10. The communication terminal of claim 1, wherein the historical information about presence of radio cells comprises attach history information in terms of moving from some specific radio access technologies or cells to other specific radio access technologies or cells.

11. The communication terminal of claim 1, further comprising a position determiner configured to determine the position of the communication terminal.

12. The communication terminal of claim 11, wherein the position determiner is configured to determine the position of the communication terminal based on a radio cell to which the communication terminal is being connected.

13. The communication terminal of claim 1, wherein the cell search is a cell search for a selection of a cell operating according to the radio access technology or a cell search for a reselection or a handover from a cell of a first communication network operating according to the radio access technology to a different cell of same or different communication network operating according to a second radio access technology, wherein the second radio access technology is the same or different compared to the radio access technology.

14. The communication terminal of claim 13, wherein the radio access technology and the second radio access technology are cellular mobile communication network technologies.

15. The communication terminal of claim 13, wherein the radio access technology and the second radio access technology are each one of a 2G radio access technology, a 3G radio access technology or a 4G radio access technology.

16. The communication terminal of claim 1, wherein each search iteration corresponds to a search process in a predetermined number of time slots.

17. The communication terminal of claim 1, wherein the search control information includes one or more radio cells operating on the radio access technology to be searched for.

18. A method for performing a cell search comprising:
determining cell search control information including at least one of a radio access technology (RAT) to be searched for, a search duration, a number of search iterations, or a number of antennas to be used for the search based on information about radio conditions at a position of a communication terminal and historical information about presence of radio cells at the position of the communication terminal, wherein the historical information about presence of radio cells comprises information about radio cells to which the communication terminal has previously connected at the position of the communication terminal;
performing a cell search based on the determined cell search control information to identify a radio cell of the RAT to be searched for; and
causing the communication terminal to move a connection from a previous radio cell of a previous RAT to the radio cell of the RAT to be searched for.

19. A non-transitory computer readable storage medium having recorded instructions thereon which, when executed by a processor, cause the processor to:
determine cell search control information including at least one of a radio access technology (RAT) to be searched for, a search duration, a number of search iterations, or a number of antennas to be used for the search based on information about radio conditions at a position of a communication terminal and historical information about presence of radio cells at the position of the communication terminal, wherein the historical information about presence of radio cells comprises information about radio cells to which the communication terminal has previously connected at the position of the communication terminal;
perform a cell search based on the determined cell search control information to identify a radio cell of the RAT to be searched for; and
cause the communication terminal to move a connection from a previous radio cell of a previous RAT to the radio cell of the RAT to be searched for.

20. A communication terminal comprising:
a determiner configured to determine cell search control information corresponding to a cell search, the cell search control information including a number of antennas to be used for the cell search based on at least one of information about radio conditions at a position of the communication terminal or historical information about presence of radio cells at the position of the communication terminal, wherein the determiner is configured to set the number of antennas to be used for the cell search to a single antenna if a reception strength at the communication terminal is above a first predetermined threshold and to set the number of antennas to be used for the cell search to multiple antennas if the reception strength is below the first predetermined threshold; and
a transceiver, coupled to the determiner, and configured to perform the cell search based on the determined cell search control information to identify a radio cell of a second radio access technology (RAT), and to cause the communication terminal to move a connection from a previous radio cell of a first RAT to the radio cell of the second RAT.

* * * * *